United States Patent

[11] 3,619,566

[72] Inventor Thomas E. Finch
    Acton, Ind.
[21] Appl. No. 48,051
[22] Filed June 22, 1970
[45] Patented Nov. 9, 1971
[73] Assignee General Electric Company

[54] CYLINDRICAL ELECTRIC HEATER WITH CLAMPING MEANS
    8 Claims, 4 Drawing Figs.
[52] U.S. Cl. ................................................ 219/535, 219/301
[51] Int. Cl. ........................................................ H05b 3/58
[50] Field of Search ............................................ 219/225, 301, 535

[56] References Cited
    UNITED STATES PATENTS
    1,269,052  6/1918  Clark et al. ............... 219/535
    2,754,406  7/1956  Browne ..................... 219/535 X
    1,937,599  12/1933 Shelton ..................... 219/535
    3,475,597  10/1969 Desloge ..................... 219/535
    1,312,554  8/1919  Logan ....................... 219/535

Primary Examiner—Ralph F. Staubly
Attorneys—David M. Schiller, Arthur E. Fournier, Jr., Frank L. Neuhauser, Oscar B. Waddell and Joseph B. Forman ABSTRACT: A cylindrical or band heater for heating a cylindrical object includes a pair of arcuate heater means each having a pair of ends with the ends of one heater means adjacent the ends of the other heater means when the heater means surround the object. Hooks are provided on the ends of both heater means and a spring is releasably received by the hooks on one pair of adjacent ends to connect such ends. An adjustable clamping means is releasably received by the hooks on the other pair of ends to adjustably connect such ends, the clamping means including a rotatable screw which when tightened draws the associated hooks and also said other pair of ends towards each other whereby the spring is placed in tension.

PATENTED NOV 9 1971

3,619,566

INVENTOR
THOMAS E. FINCH
BY David M. Schiller
ATTORNEY 3,619,566

CYLINDRICAL ELECTRIC HEATER WITH CLAMPING MEANS

BACKGROUND OF THE INVENTION

1. Field of the Invention

This invention relates to cylindrical or band electrical heaters and particularly to such heaters with clamping means for clamping the heater in surrounding relation with an object to be heated.

2. Description of the Prior Art

Cylindrical or band heaters have previously been employed for heating objects of cylindrical configuration. Such heaters have typically comprised two or more arcuate strip heaters disposed to surround the object to be heated and clamped thereto by a separate stainless steel clamping band which surrounds the strip heaters and which includes spaced ends adjustably connected by a rotatable screw. Rotation of the screw effects tightening of the band to clamp the strip heaters in engagement with the outer surface of the object to be heated. Such prior art arrangement has not been entirely satisfactory inasmuch as the clamping bands are quite costly and it has been necessary to stock clamping bands of various diameters to accommodate various sized objects to be heated. Further, the assembly and disassembly of the strip heaters and the clamping bands have involved cumbersome and time consuming operations.

OBJECTS OF THE INVENTION

It is an object of the invention to provide a cylindrical or band heater with novel and improved clamping means for clamping the heater in surrounding relation to an object to be heated.

It is another object of the invention to provide such a heater wherein the clamping means includes a spring which is constantly in tension to maintain the heater in tight engagement with the object.

It is still another object of the invention to provide such a heater which eliminates the need for a separate clamping band to clamp the heater to the object.

It is a further object of the invention to provide such a heater wherein the clamping means includes a minimum number of inexpensive parts adapted for releasable mounting on the heater to permit rapid assembly and disassembly of the heater relative to the object.

SUMMARY OF THE INVENTION

In carrying out the invention in one preferred form, there is provided a band heater which is adapted to surround a cylindrical object to be heated, the band heater including a pair of arcuate heater means each having a pair of ends with the ends of one of the heater means positioned adjacent the ends of the other heater means when the heater means are operatively associated with the object. Electrical terminal means are mounted on each of the heater means for permitting energization thereof and tabs are provided on the ends of both of the heater means. A spring is provided for releasable engagement with the tabs on one pair of adjacent ends of the heater means to connect such ends, and clamping means are provided for adjustably connecting the other pair of adjacent ends of the heater means. The clamping means preferably includes a pair of clamp plates having mounting sections for releasable engagement with hooks formed by the tabs on the other pair of adjacent ends of the heater means and a screw threadably engages a threaded opening of one of the clamp plates. The screw is effective when rotated in a tightening direction to draw the clamp plates and thereby associated ends of the heater means towards each other whereby the spring is placed in tension to firmly clamp the heater means about the object to be heated.

DESCRIPTION OF A PREFERRED EMBODIMENT

Figure 1:
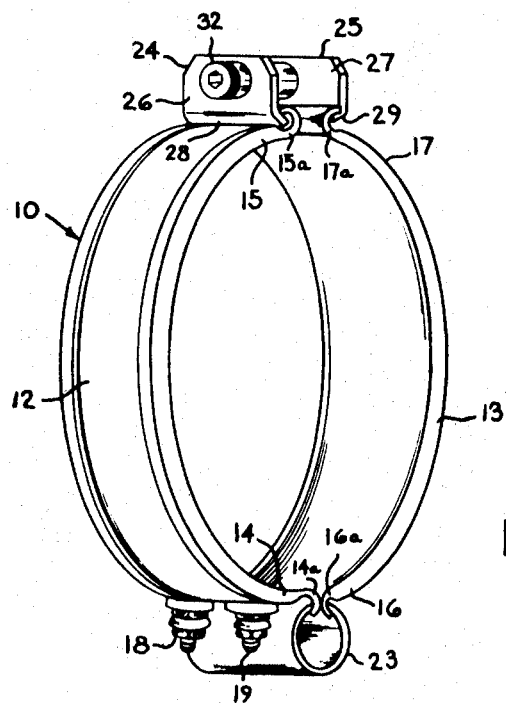
FIG. 1 is a view in perspective showing the band heater and clamping means in accord with the present invention.
Figure 3:
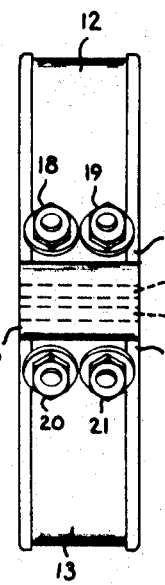
FIG. 3 is a view in side elevation of the band heater and clamping means taken along the line 3—3 of FIG. 2.
Figure 4:
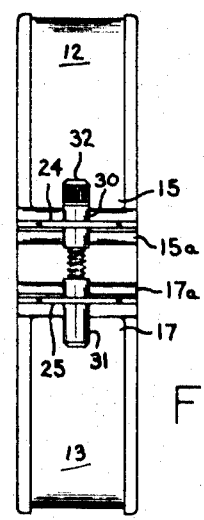
FIG. 4 is a view in side elevation of the band heater and clamping means taken along the line 4—4 of FIG. 2.
Figure 2:
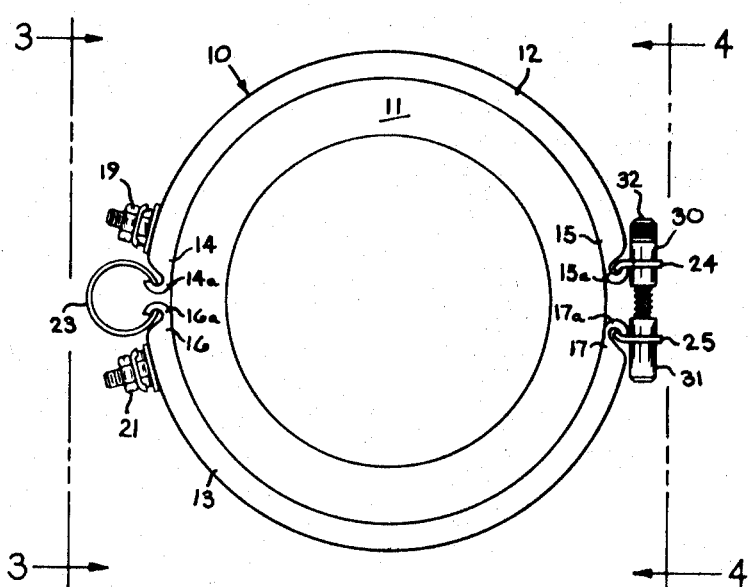
FIG. 2 is a view in top plan of the band heater and clamping means shown in FIG. 1 in surrounding relation with an object to be heated.

Referring now to the drawing there is illustrated in FIG. 1 a cylindrical or band heater represented generally by the numeral 10 which is adapted to be clamped in surrounding relation with a correspondingly shaped cylindrical object 11 which is to be heated. The object 11 may assume a variety of forms such as a hollow pipe for conducting a suitable fluid which it is desired to heat. In the specific embodiment illustrated the band heater 10 includes a pair of heaters 12 and 13 each of arcuate generally semicircular configuration which when clamped together define substantially a circle. Although the band heater 10 is shown as including two heaters 12 and 13, the invention is not so limited and is also applicable to a band heater including more than two heaters, such as three heaters which may be employed in association with large diameter objects. The heaters 12 and 13 may be of any suitable construction and in the particular embodiment illustrated comprise electrical resistance heating elements (not shown) embedded in a suitable insulating material (not shown) which in turn is enclosed in a suitable metallic outer sheath. It is understood, however, that the invention is not limited to such a heater construction and is applicable as well to other heater constructions. The heater 12 includes a pair of spaced ends 14 and 15 whereas the heater 13 includes spaced ends 16 and 17. When the heaters 12 and 13 are operatively positioned to surround an object 11 as shown in FIG. 2, the ends 14 and 15 of the heater 12 are respectively disposed adjacent the ends 16 and 17 of the heater 13. Each of the heaters 12 and 13 includes a pair of electrical terminals in order to permit energization of the associated heating elements and for this purpose, a pair of terminals 18 and 19 are mounted on the heater 12 adjacent its end 14 and a pair of terminals 20 and 21 are mounted on the heater 13 adjacent the end 16 as best shown in FIG. 3.

In order to mount parts of the improved clamping means described hereinafter, tabs are provided on the ends of the heaters 12 and 13. The tabs are preferably integrally formed on the ends of the heaters to provide hooks and for this purpose each end of the heaters 12 and 13 is flattened to define a tab which is reversely bent to provide a hook at each end of the heaters. Such a construction is shown in FIGURE 2 which illustrates the ends 14, 15, 16 and 17 of the heaters 12 and 13 having tabs which are reversely bent to provide hooks 14a, 15a, 16a and 17a. In accord with the invention one pair of adjacent ends of the heaters 12 and 13 are connected by spring means and in the preferred embodiment illustrated, the ends 14 and 16 of the heaters 12 and 13 are connected by a spring 23 having spaced ends which are in releasable interfitting engagement with the hooks 14a and 16a formed on the ends 14 and 16. As best shown in FIGS. 1 and 2 the spring 23 comprises an axially slotted tubular member having a generally C-shaped cross-sectional area taken along a plane perpendicular to its axis and having an axial length substantially equal to the width of heaters 12 and 13. The spring 23 is preferably formed of stainless steel so as to be operable at elevated temperatures produced when the heaters are energized. The spring 23 is designed to provide substantial force and is sufficiently small to provide adequate electrical clearance to the terminals 18, 19, 20 and 21. The spring 23 is associated with the ends 14 and 16 rather than with the ends 15 and 17 inasmuch as the provision of the terminals 18, 19, 20 and 21 on the ends 14 and 16 limits the available space so as to preclude location of the adjustable clamping means in association with the ends 14 and 16.

In order to adjustably connect the ends 15 and 17 of the heaters 12 and 13 the invention provides adjustable clamping means mounted by the hooks 15a and 17a on the ends 15 and 17. In accord with the preferred embodiment of the invention the clamping means comprises a pair of clamp plates 24 and 25 of substantially identical configuration which include main planar sections 26 and 27 respectively and mounting sections 28 and 29 which are integrally connected to the main sections 26 and 27 and which extend angularly from the planes of the associated main sections for releasable interfitting engagement with the hooks 15a and 17a on the ends 15 and 17. The plates 24 and 25 carry respectively hollow tubular projections 30 and 31 extending at each side of the main sections 26 and 27 so as to be in axial alignment when the plates 24 and 25 are operatively positioned as shown in FIG. 2. The projections 30 and 31 receive a threaded screw 32 and the projection 31 is internally threaded to threadably engage the threads of the screw 32.

In order to assemble the heater 10 and to clamp it to the object 11, the heaters 12 and 13 are first positioned about the outer surface of the object 11 with the ends 14, 16 and 15, 17 in alignment so that the hooks 14a and 16a are in abutting relation. The axial slot of the spring 23 is then aligned with the hooks 14a and 16a on the ends 14 and 16 and the spring 23 is moved relative to the hooks in a direction perpendicular to the plane of the paper as viewed in FIG. 2 so that the ends of the spring 23 are received by such hooks. Such movement is continued until the spring 23 is approximately centrally positioned with respect to the widths of the heaters 12 and 13. The assembly comprising the plates 24 and 25 and the screw 32 engaged with the projections 30 and 31 is next mounted on the ends 15 and 17 by aligning the mounting sections 28 and 29 with the hooks 15a and 17a on the ends 15 and 17 and moving such assembly in a direction perpendicular to the plane of the paper as viewed in FIG. 2 relative to the hooks so that the mounting sections 28 and 29 are received by such hooks. The assembly operation is completed by rotating the screw 32 in a tightening direction to draw the plates 24 and 25 and thereby the ends 15 and 17 towards each other until the heaters 12 and 13 are tightly clamped about the outer surface of the object 11. Such tightening of the screw 32 separates the ends 14 and 16 a small distance to expand the spring 23 which is thereby placed in tension to exert a force which urges the ends 14 and 16 towards each other. In order to disassemble the heaters 12 and 13 from the object 11 it is only necessary to rotate the screw 32 in the opposite direction to displace the plates 24 and 25 away from each other until the assembly of the plates 24 and 25 and the screw 32 can be released from the hooks 15a and 17a on the ends 15 and 17. The spring 23 is then released from the hooks 14a with 16a on the ends 14 and 16 thus permitting removal of the heaters 12 and 13 from about the object 11.

The invention provides a cylindrical or band heater and clamping arrangement which eliminates the need for a separate clamping band as heretofore required in prior art structures. The improved clamping arrangement provides a very effective clamping action with a minimum number of inexpensive parts consisting only of the spring 23, the plates 24 and 25 and the screw 32. The arrangement is such that the hooks on the ends of the heaters 12 and 13 provide pivots for the plates 24 and 25 to permit use of the heater and clamp arrangement with objects 11 of various diameters. Also, the design is such that the clamping force exerted by the plates 24 and 25 is close to the bases of the hooks which prevents excessive leverage tending to open the hooks. Further, the spring 23 provides a self-adjustment during expansion and contraction of the heaters 12 and 13 in response to heating and cooling of the heaters.

Although the invention has been described with reference to certain specific embodiments thereof, numerous modifications are possible and it is desired to cover all modifications falling within the spirit and scope of the invention.

What I claim as new and desire to secure by Letters Patent of the United States is:

1. The combination comprising;
    a cylindrical electrical heater adapted to surround a cylindrical object to be heated,
    said heater including a pair of arcuate heater means each having a pair of ends with the ends of one of said heater means positioned adjacent the ends of the other of said heater means when the heater surrounds an object,
    said ends of said heater means each having a reversely bent end section to provide a hook on each of said ends,
    spring means for connecting one pair of adjacent ends of said heater means, said spring means having spaced ends for releasable engagement with the hooks on said one pair of ends of said heater means,
    electrical terminal means mounted on each of said heater means adjacent said one pair of ends of said heater means to permit energization thereof, and
    clamping means for adjustably connecting the other pair of adjacent ends of said heater means,
    said clamping means comprising a pair of plates each having a main section containing an opening and having a mounting section integrally connected to said main section and extending angularly from the plane of the main section for releasable engagement with the hooks on said other pair of ends of said heater means, the opening of the main section of one of said plates being internally threaded, and
    a screw for engagement with said openings, said screw being effective when tightened to draw said plates and thereby said other pair of adjacent ends of said heater means towards each other whereby said spring means is placed in tension.

2. The combination of claim 1 wherein said spring means comprises an axially slotted tubular member having a generally C-shaped cross-sectional area taken along a plane perpendicular to its axis.

3. The combination of claim 1 wherein said openings are formed in hollow tubular projections extending from said main sections along axes generally perpendicular to the planes of said main sections.

4. the combination comprising;
    a cylindrical electrical heater adapted to surround a cylindrical object to be heated,
    said heater including a pair of arcuate heater means each having a pair of ends with the ends of one of said heater means positioned adjacent the ends of the other of said heater means when the heater surrounds an object,
    electrical terminal means mounted on each of said heater means for permitting energization thereof,
    tabs on the ends of each of said heater means,
    spring means for connecting one pair of adjacent ends of said heater means, said spring means having spaced ends for releasable engagement with the tabs on said one pair of ends of said heater means, and
    clamping means for adjustably connecting the other pair of adjacent ends of said heater means,
    said clamping means including a pair of clamp members having mounting sections for releasable engagement with the tabs on said other pair of ends of said heater means, said clamp members each having an opening one of which is internally threaded, and
    a screw for engagement with said openings, said screw being effective when tightened to draw said clamp members and thereby said other pair of adjacent ends of said heater means towards each other whereby said spring means is placed in tension.

5. The combination of claim 4 wherein said electrical terminal means are mounted adjacent said one pair of ends of said heater means.

6. The combination of claim 4 wherein said spring means comprises an axially slotted tubular member having a generally C-shaped cross-sectional area taken along a plane perpendicular to its axis.

7. The combination of claim 4 wherein said clamp members comprise plates having a main section containing said opening, said mounting section being integrally connected to said main section and extending angularly from the plane of said main section.

8. The combination of claim 6 wherein said clamp members comprise plates having a main section containing said opening, said mounting section being integrally connected to said main section and extending angularly from the plane of said main section.

* * * * *